United States Patent [19]

Nunés et al.

[11] 3,966,048
[45] June 29, 1976

[54] INSPECTION OF GLASS ARTICLES

[75] Inventors: Emmanuel Núnes, Ribecourt; Jacques Vervin, Thourotte, both of France

[73] Assignee: Saint-Gobain Industries, Neuilly-sur-Seine, France

[22] Filed: July 21, 1975

[21] Appl. No.: 597,911

[30] Foreign Application Priority Data
July 19, 1974 France .............................. 74.25137

[52] U.S. Cl. .................................. 209/82; 209/73; 209/111.7 T; 214/1 BT; 271/5; 198/19; 198/218
[51] Int. Cl.² .......................................... B07C 5/04
[58] Field of Search ............... 209/73, 80, 80.5, 82, 209/88 R, 88 S, 111.7 T; 214/1 BB, 1 BT; 271/5, 14; 198/19, 20, 218

[56] References Cited
UNITED STATES PATENTS

| | | |
|---|---|---|
| 2,740,521 | 4/1956 | Calvin .................................. 209/82 |
| 3,215,269 | 11/1965 | Walters ................................ 209/73 |
| 3,218,066 | 11/1965 | Halberschmidt et al. ........ 209/885 X |
| 3,311,233 | 3/1967 | Helmbrecht et al. ................ 209/73 |
| 3,334,891 | 8/1967 | Clausen et al. ..................... 271/9 X |

*Primary Examiner*—Robert B. Reeves
*Assistant Examiner*—Joseph J. Rolla
*Attorney, Agent, or Firm*—Karl W. Flocks

[57] ABSTRACT

Inspection apparatus for glass articles, particularly curved glass panes produced by a tempering and shaping furnace, including a jig providing a reference shape with which the shape of the article is compared, conveyors for feeding and removing the articles and a carriage for moving the articles between the conveyors and the jig and rejection means for rejecting broken or mishapen articles. The articles are lifted by pneumatic seizing devices carried by the carriage.

14 Claims, 3 Drawing Figures

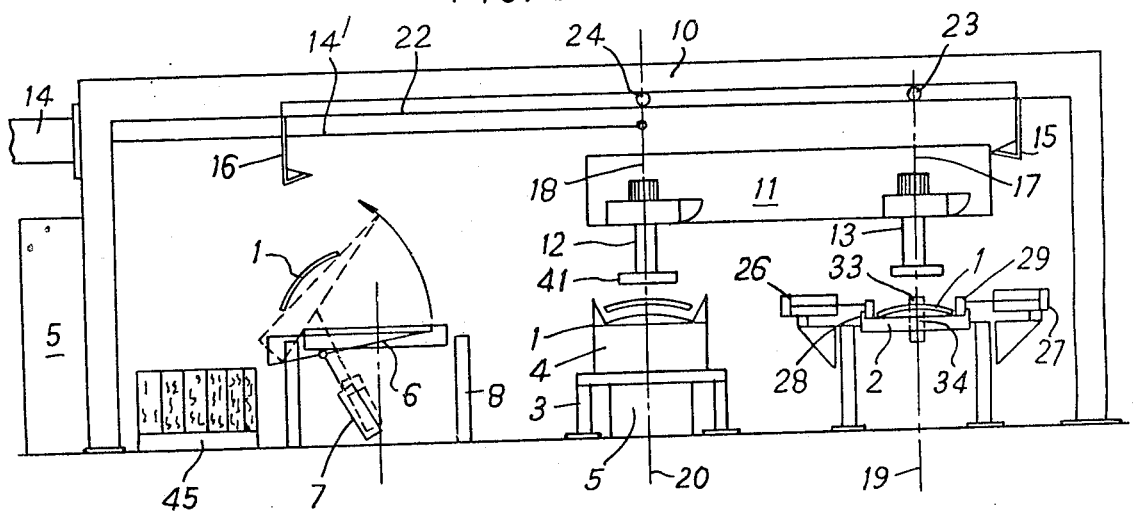
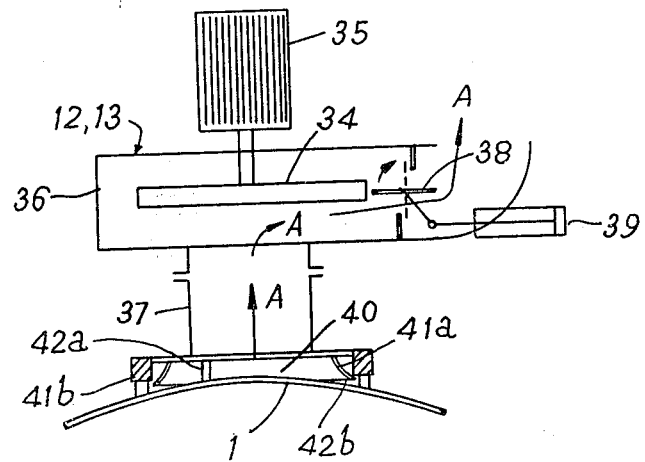

INSPECTION OF GLASS ARTICLES

BACKGROUND OF THE INVENTION

This invention relates to automatic inspection apparatus for glass articles, especially for inspecting the curvature of curved panes leaving a horizontal shaping and tempering furnace comprising a feed conveyor on which the panes advance one behind the other, an inspection station at which the panes stop to be compared with a reference jig, circuits for comparing the measured magnitudes with control reference magnitudes as the case requires, a device for ejecting poor quality panes and a conveyor for removing good quality panes.

DISCUSSION OF PRIOR ART

Such an apparatus is described in U.S. Pat. No. 3,311,233.

Horizontal shaping and tempering furnaces are generally formed by a heated enclosure having a certain interior length in which the panes advance one behind the other on transporter rollers. When the panes reach the end of the heated enclosure their temperature, of the order of 650°C is close to the temperature of softening so that it is possible to give them the desired shape.

Generally panes which are intended for automobile windows, especially windscreens, require a curvature conforming to normes fixed by the car constructor. Shaping is carried out in a press of which the plates are of the desired shape. After shaping the panes enter a tempering furnace where they are subjected to a current of cold air at a high flow rate in order to reduce very sharply their temperature which gives them the toughness characteristic of tempered glass.

Even with very careful operation of these furnaces a certain proportion of tempered panes differ from the desired shape. It is therefore necessary to inspect them before they can be delivered to the car constructor.

For a long time this inspection has been carried out manually and consists of positioning each pane on a metal or plaster jig having the desired shape determined by the car constructor and evaluating by means of a graduated calibrated gauge the degree of play which may exist between the jig and the pane. When this play is situated within the acceptable limits of tolerance the pane is declared good; in the inverse case is it rejected.

It will be understood that such inspection operations require time and numerous personnel who are conscientious and qualified.

To avoid this automatic apparatus of the kind described in U.S. Pat. No. 3,311,233 has been used and allows an appreciable gain in time and greater consistency.

However the apparatus described in U.S. Pat. No. 3,311,233, has the disadvantage of requiring the positioning in succession of the panes and their taking between the jaws of the measuring apparatus which can cause parasite deformations. The apparatus of the present invention avoids these disadvantages while leaving the panes horizontal during the whole process of inspection and allowing them to rest freely under the force of their weight only on the jig of the inspection station.

GENERAL DESCRIPTION OF THE INVENTION

The apparatus of the present invention, comprises a carriage provided with two devices for seizing articles such as panes the carriage being driven by a motor means in to and fro movement between two abutments at the end of the path placed in the following manner: at the departure position the vertical axes of the seizing devices are found, the first on a longitudinal axis of the feed conveyor, the second on an axis of the inspection jig. At the arrival position, the first seizing device axis is on the axis of the inspection jig and the second seizing device axis on a longitudinal axis of the removal conveyor. In this manner, at the moment when the article is taken by the feed conveyor to be brought to the inspection station, a preceding article is taken from the inspection station led to the removal conveyor.

In fact it is difficult to position an inspection station between the rollers of a horizontal conveyor of the roller type and so the inspection station is situated generally at the side of the feed conveyor.

In order to ensure a high attainable frequency for the operations of seizing and depositing the articles which would otherwise require complicated mechanical members such as motors, abutments and micro-contacts at the end of the path of travel, there are used pneumatic seizing means which aspirate the articles from a distance, thus avoiding inertia and complications caused by mechanical members.

The seizing means are formed by an aspirator mounted in an enclosure, forming an aspiration duct and a valve movable by a motor device such as a jack between an open position allowing a current of aspirated air to travel through the duct, the seizing device then being in the operative state and a closed position which interrupts the current of aspirated air, the seizing device then being in the inoperative state. The duct is generally situated vertically below the enclosure and has an orifice comprising a lip made of flexible material which may be provided with a slot leading to the atmosphere, the lip being mounted at an appreciable constant distance from the general plane of the conveyors and the inspection jig, its periphery being within the periphery of the jig. In a preferred embodiment the feed conveyor comprises a detector for passage of articles which, when it is excited, gives control signals to motor devices such as jacks which cause the advance from the edge of the conveyor in the direction of its central longitudinal axis of a first centering member followed after elapse of a short period of time by the advance of a second centering member from the opposite edge towards said axis of the conveyor in order to position the article on a given axis of the conveyor. The feed conveyor may also comprise a detector for passage of the leading edge of the article and a detector for passage of the rear edge of the article situated on either side, the first downstream and the second upstream, with respect to the conveyor, of the carriage, simultaneous excitation of the two detectors giving a control signal to a motor device such as a jack which places and maintains in position a stop abutment for the article.

The inspection jig may comprise a plurality of pneumatic touch members distributed around its edge emitting signals in response which are fed to a calculator of known type which compares the measured values to reference values and, when at least one of the measured values falls outside the given tolerance limits, the calculator emits a control signal which activates a motor member which acts on a ejection member formed by a lifting fork situated in the removal conveyor.

BRIEF DESCRIPTION OF DRAWINGS

A preferred embodiment of apparatus according to the invention will be described by way of example with reference to the accompanying drawings, in which:

FIG. 2 is a schematic elevation of the apparatus of FIG. 1,

FIG. 3 is a schematic section of part of the apparatus of FIG. 2.

DESCRIPTION OF PREFERRED EMBODIMENTS

Figure 1:
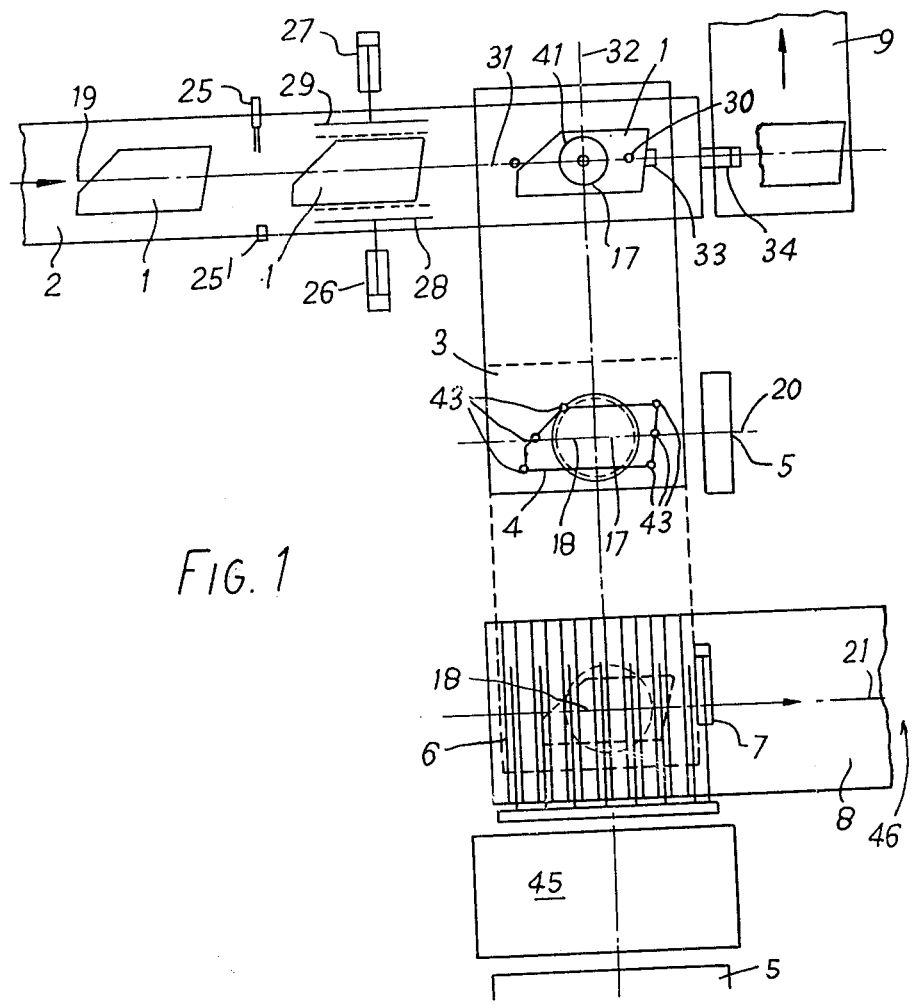
FIG. 1 is a schematic plan view of apparatus according to the invention.

Referring to FIGS. 1 and 2, apparatus for automatic inspection of the curvature of curved glass sheets 1 at the outlet of a furnace for shaping or horizontal tempering of the sheets comprises a feed conveyor 2 on which the sheets 1 advance one after the other, an inspection station 3 at which the sheets are deposited to be compared with a reference jig 4, comparison circuits of known type indicated schematically by 5 for comparing magnitudes measured at the inspection station with reference magnitudes, a rejection device 6 controlled by the comparison circuits for rejection of poor quality sheets through a motor device 7 and a removal conveyor 8 for removing satisfactory sheets.

The apparatus also comprises at the end of the feed conveyor 2 a conveyor 9 for removing sheets which have been broken during the tempering process.

All the conveyors 2, 8 and 9 are horizontal and of a well-known type using rollers; they will not be described in detail as their constitution and operation are well understood in the art.

Above the end of the conveyor 2, the inspection station 3 and the end of conveyor 8 there is provided a cross bar of profile shown schematically as 10 in FIG. 2. This cross bar 10 supports a carriage 11 comprising two devices for seizing sheets 12 and 13 driven by a motor device shown schematically at 14, in motion to and fro between two abutments 15 and 16 at the ends of the path of travel of the carriage 11 placed in such a manner that at the position of departure the vertical axis 17 and 18 of the seizing devices 12 and 13 are positioned respectively on the longitudinal axis 19 of the feed conveyor 2, and on an axis 20 of the jig 4 so that at the arrival position shown in dotted lines in FIG. 1, the seizing devices 12 and 13 being in the inoperative state, the first axis 17 is positioned on the axis 20 of the jig 4 and the second axis 18 on the longitudinal axis 21 of the removal conveyor 8 so that at the moment when a sheet 1 is taken from the feed conveyor 2 to be brought to the inspection station 3 a preceding sheet 1 is taken from the inspection station 3 to the removal 8. The motor device 14 is shown schematically at FIG. 2; it comprises a jack of which the push-rod 14' drives the carriage 11. The jack is of well-known constitution and, in order to simplify this description, it will not be described further.

Under the action of jack 14 the carriage 11 is displaced, suspended from rollers 23 and 24 mounted on two horizontal rails 22 which are straight and parallel between the two abutments 15 and 16 at the ends of the path of travel. The feed conveyor 2 is provided with a detector 25, 25' for passage of the panes which, when excited, emits control signals to motor devices comprising jacks 26 and 27 which cause the advance from an edge of the conveyor 2 to the axis 19, of a first centering member 28 followed, after elapse of a short period of time, by the advance of a second centering member from the edge towards the axis 19 of the conveyor 2 in such a manner as to position the sheet 1 in alignment with the axis 19 of the conveyor 2. It will be evident that the movement of these members 28 and 29 is controlled as a function of the transverse dimensions of the sheet 1. The feed conveyor 2 also comprises a detector 30 for detecting passage of the forward edge of a sheet 1 and a detector 31 for passage of the rear edge of the sheet, the first detector 30 being downstream and the second 31 upstream of axis 32, simultaneous excitation of these two detectors 30 and 31 gives a control signal to a motor device such as a jack 34 which positions and maintains in place the abutment member 33 in a position to stop motion along axis 19 of the pane 1.

Excitation of only a single detector for the passage downstream 30 causes maintenance of the stop abutment 33 outside the path of the sheet 1.

This system for detection has the purpose of ejecting after their arrival at the end of the feed conveyor 2 the sheets 1 which may have been broken during the preceding tempering operation.

When a sheet 1 is intact, the two detectors 30 and 31 are simultaneously excited and the abutment 33 is placed and maintained in place, which has the effect of stopping the sheet 1 on the axis 32 containing the seizing device 13.

On the other hand, if the sheet 1 is broken, only the downstream detector 30 is excited; the abutment 33 then remains in a rest position during travel of the pane which thus continues its path from the conveyor 2 to the conveyor 9, which takes it away towards a waste receptacle which is not shown in the drawings.

FIG. 3 shows a seizing device 12 or 13 in more detail. A fan 34 is driven by a motor 35 and mounted in an enclosure 36 comprising an aspiration duct 37 and an evacuation valve 38 moved by a motor device such as a jack 39 between an open position, shown in solid lines in the figure, and a closed position shown in dotted lines. When valve 38 is open a current of aspirated air travels along a path shown by the arrows A in the duct 37, the seizing device 12 or 13 then being in the active state. When valve 38 is closed the aspirated current of air A is interrupted, the seizing device 12 or 13 then being in the inactive state. As shown in the FIG. 3, the duct 37 is vertical, situated below the enclosure 36 and its lower orifice 40 is provided with a lip 41a of flexible material, preferably associated with a stabilising abutment 41b and provided with a slot 42a or 42b open to the atmosphere. The abutment members 41b are adjustable for use with sheets having various contours.

As shown in FIG. 2 the lip 41a is positioned at a constant distance which is not negligible from the general plane of the conveyors 2 and 8 and from the inspection jig 4.

The mode of operation of the devices 12 and 13 will appear from the following description.

When the valve 38 is closed, there is practically no circulation of air in the duct 37. When the jack 39 causes opening of the valve 38 a strong current of ascending air A is established in the duct 37 through the enclosure 36 and leaves by the orifice which is opened by the valve. This ascending current A immediately draws a sheet 1 which is positioned on the conveyor 2 or the inspection station 3 below the orifice 40 to come into contact with the lip 41a and the abutment 41b.

The slot 42 allows communication of the interior of the duct with the external atmosphere. During all the time that the sheet 1 remains stuck to the orifice 40 there is established a current of air from the exterior towards the interior of the duct 37. This current is too great to allow disengagement and fall of the sheet 1. When the jack 39 closes the valve 38 the pressure within the duct 37 becomes equal to the external atmospheric pressure by passage of air through slot 42 and so the pane driven by its weight falls at the instant when the valve 38 is closed.

It will be noted that owing to the seizing devices 12 and 13 it is possible to lift or to deposit the sheets 1 pneumatically in an instantaneous manner without having recourse to mechanical installations which are complicated and costly. Any mechanical installation for performing an equivalent function necessarily comprises members such as motors, guiding rails, abutments at the end of the path of travel, jacks micro contacts and connecting rods which would introduce, quite apart from elevated cost, an inertia which would prejudice the action of the apparatus.

By way of example an aspirator of well-known design driven by a motor of 3 kW power at 3000 revs. per minute, would create, across a duct of 200 mm diameter, a vacuum of about 500 mm water gauge and allows instant taking up, the lip being situated at 50 mm from the conveyor, of sheets which may weigh up to about 5kg. The orifice 40 being positioned, as has been said, at a distance of about 50 mm from the general plane of conveyors 2 and 8 and from the inspection jig 4, it is possible to lift all types of panes whatever their curvature, provided it remains less than 50 mm and this without having to go through a process of regulating the height of the seizing devices 12 and 13 in relation to the general plane of the conveyors 2, 8 and of the jig 4 of the inspection station 3.

It will be appreciated that mechanical gripping devices, in contrast, would require such adjustments.

The inspection station 3 will not be described in more detail.

The inspection jig 4 comprises a plurality of pneumatic contact members 43 distributed around its perimeter capable of emitting signals as a function of the space which may exist between the sheet 1 and the jig 4 adjacent each contact member, the signals are fed into the calculator 5 which compares the measured values with reference values.

When at least one of the measured values falls outside predetermined limits of tolerance, the calculator, 5 emits a control signal which activates a jack 7 which acts on a ejector member 6 comprising a lifting form situated in the conveyor 8, the branches of the fork being able to travel between the rollers 44 of the conveyor 8.

When the ejector fork 6 is lifted, the sheet 1 positioned thereabove is ejected into a waste receptacle 45.

When the signals emitted by the pneumatic contact members 43 fall inside the limits of tolerance, the pane is considered satisfactory; the lifting fork remains at its rest position and the moving conveyor 8 transports the sheet to a packaging station, not shown in the drawings, situated at the end 45 of the conveyor 8.

The assembly described functions in the following manner.

The sheet 1 leaving the tempering furnace which is of conventional type and not shown in the figures, is transported by the feed conveyor 2. When the sheet passes the detector 25, 25', a control signal is given to the jack 26, which causes advance of the member 28 from the edge of the conveyor 2 towards the axis 19; after a short lapse of time, the jack 27 receives a control signal and the member 29 is also moved towards the axis of the conveyor. The movement of the two members has the effect of positioning the sheet 1 on the axis 19 of the conveyor.

When the forward edge of the sheet arrives level with the detector 30 and when simultaneously its rear edge arrives level with the detector 31 the two detectors are simultaneously excited and emit a control signal to the jack 34 which has the effect of bringing the abutment 33 in front of the sheet 1. Even though the rollers of conveyor 2 rotate continuously the sheet 1 is maintained by the abutment 33 on the axis 32 of the carriage 11.

As has been described above, when the pane is broken the detector 31 is not excited, and the abutment 33 is not interposed in the path of the sheet 1 which continues its path of travel to arrive on the conveyor 9 and is transported in the direction indicated by an arrow towards a waste receptacle, not shown in the drawing. When the sheet, if it is not broken, is stopped by the abutment 33 the jack 39 receives from the detectors 30 and 31 a control signal and the valve 38 which has so far been closed is opened.

Immediately, the sheet 1 is aspirated by the seizing device 13. Simultaneously the jack 39 of the seizing device 12 also receives a control signal and the preceding sheet which is positioned at the inspection station 3 is aspirated by the seizing device 12.

The jack 14 then receives a control signal and the carriage 11 which abutted at 15 comes to abut at 16, as shown on the left in FIG. 2 and in dotted lines in FIG. 1.

This movement operates a micro-contact at the end of the path of travel of the carriage, which on the one hand stops the control signal for the jack 14 and on the other hand stops the control signals for the jacks 39 of the gripping devices 12 and 13.

As has already been described, the valve 38 being closed, aspiration ceases immediately and the sheets fall. The sheet underneath the seizing device 13 falls on the inspection station 3; the sheet which is underneath the seizing device 12 falls on the conveyor 8 and the ejector member 6 which transports it towards the packaging station 46 or ejects it into the refuse receptacle 45 according to the results of the inspection.

After a short delay, the jack 14 receives another control signal which has the effect of returning the carriage 11 to abutment at 15.

The cycle then recommences and when the following sheet arrives underneath the seizing member 13 the inspection of the pane at the inspection station, takes place automatically, a control signal being or not being transmitted by the calculator 5 to the jack 7 according to the results of the inspection. It will be seen that the carriage 11 having two seizing members 12 and 13 allows feed and evacuation of the inspection station 3 at each of the forward movements in a manner particularly simple and rapid, owing to the double station for aspiration.

By way of example, a carriage according to the invention, equipped with gripping devices described above allows inspection of 850 panes per hour at an inspection station comprising six touch members.

What is claimed is:

1. Automatic inspection apparatus for inspecting glass articles, which comprises an inspection station comprising a reference jig, measuring means at the inspection station for comparing at least one dimension of an article with a corresponding dimension of the jig, the measuring means being capable of emitting a signal when the difference between the dimension of the article and the reference dimension exceeds a predetermined value, horizontal feed conveyor means for feeding a succession of articles to be inspected, horizontal removal conveyor means for removing the articles after inspection, a carriage movable to and fro between abutments to transport articles from the feed conveyor to the inspection station and then from the inspection station to the removal conveyor, the carriage comprising two seizing means for seizing and lifting respective articles from the feed conveyor and jig at the inspection station when the carriage is at one end of its path of travel and to drop respective articles onto the jig and removal conveyor when the carriage is at the other end of its path of travel so that an article is successively lifted from the feed conveyor, dropped on the jig, lifted from the jig and dropped on the removal conveyor, the seizing means each comprising a downwardly directed orifice surrounded by a flexible lip having a maximum width less than the minimum dimension of the article to be seized, aspiration means for aspirating a stream of air upwardly through the orifice to attach the article to be seized thereto by suction, a duct through which the aspirated air is drawn and a valve arranged to open and shut the duct to start and stop the stream of air, and means sensitive to the position of the carriage to open and shut the duct, and rejection means for removing reject articles in response to said signal.

2. Apparatus according to claim 1, in which the ducts are provided with one or more slots allowing ingress of air.

3. Apparatus according to claim 1, in which the carriage is mounted on a pair of straight horizontal rails between the abutments and is drivable along the rails by a jack.

4. Apparatus according to claim 1, in which the conveyors are horizontal and the feed conveyor is positioned to receive glass sheets from a furnace.

5. Apparatus according to claim 4, in which the vertical separation between said orifices and the upper surfaces of the glass sheets is from 10 to 50 mm.

6. Apparatus according to claim 1, in which the orifices are provided with abutment members to prevent contact between the articles and the flexible lips.

7. Apparatus according to claim 6, in which the abutment members are adjustable in height.

8. Apparatus according to claim 1, in which the inspection jig comprises a plurality of touch members distributed around the periphery of the jig, pneumatic means for moving the touch members into contact with an article on the jig, signal emitting means for emitting a signal related to the portions of the touch members in contact with the article, and comparison means for comparing the emitted signal with a reference signal.

9. Apparatus according to claim 8, in which the comparison means is arranged to emit a control signal when the difference between said emitted signal and the reference signal exceeds a predetermined value and motor means responsive to said control signal are provided to operate said rejection means.

10. Apparatus according to claim 9, in which the removal conveyor comprises a series of rollers by which the articles are carried during removal and the rejection means comprises a fork which is normally below the rollers and is raised between the rollers when operated by said motor means to lift the reject articles.

11. Apparatus according to claim 1, in which the feed conveyor is provided with at least one detector sensitive to passage of an article along the conveyor, the detector emitting a signal on passage of an article, motor means sensitive to the signal and a centering member connected to and driven by the motor means to urge the article to a predetermined position on the feed conveyor transverse to the direction of motion along the conveyor.

12. Apparatus according to claim 11, provided with two sets of motor means and centering members, the respective centering members urging the article to said predetermined position from opposite sides of the conveyor and one motor means being operable after the other.

13. Apparatus according to claim 1, in which the path of travel of the carriage is transverse to the feed conveyor and the feed conveyor is provided with two detectors respectively sensitive to arrival of a forward edge and a rearward edge of the article on the feed conveyor at a seizing position at which the article is seized by said seizing means on the carriage, an abutment member movable between an inoperative position and an operative position at which it blocks further movement of the article along the feed conveyor and motor means for moving the abutment member, the motor means being activable to move the abutment member to said operative position in response to detection signals emitted by both detectors.

14. Apparatus according to claim 13, in which the motor means maintains the abutment member in its inoperative position on receipt of a detection signal from one only of said detectors and rejection means are provided at an end of the feed conveyor to receive articles which are conveyed past said seizing position.

* * * * *